United States Patent
Gaertner et al.

(10) Patent No.: US 9,021,807 B2
(45) Date of Patent: May 5, 2015

(54) WASTE HEAT UTILIZATION DEVICE AND OPERATING METHOD

(71) Applicant: Daimler AG, Stuttgart (DE)

(72) Inventors: Jan Gaertner, Leonberg (DE); Thomas Koch, Boeblingen (DE)

(73) Assignee: Daimler AG, Stuttgart (DE)

( * ) Notice: Subject to any disclaimer, the term of this patent is extended or adjusted under 35 U.S.C. 154(b) by 103 days.

(21) Appl. No.: 13/918,936

(22) Filed: Jun. 15, 2013

(65) Prior Publication Data

US 2013/0327041 A1    Dec. 12, 2013

Related U.S. Application Data

(63) Continuation-in-part of application No. PCT/EP2011/006039, filed on Dec. 2, 2011.

(30) Foreign Application Priority Data

Dec. 16, 2010  (DE) .................. 10 2010 054 733

(51) Int. Cl.
| | | |
|---|---|---|
| F02G 3/00 | (2006.01) | |
| F01N 5/02 | (2006.01) | |
| F01K 13/02 | (2006.01) | |
| F01K 23/06 | (2006.01) | |
| F02G 5/02 | (2006.01) | |

(52) U.S. Cl.
CPC . F01N 5/02 (2013.01); F01K 13/02 (2013.01); F01K 23/065 (2013.01); F02G 5/02 (2013.01); *Y02T 10/166* (2013.01)

(58) Field of Classification Search
None
See application file for complete search history.

(56) References Cited

U.S. PATENT DOCUMENTS

| | | | | |
|---|---|---|---|---|
| 4,765,148 A | * | 8/1988 | Ohashi | 62/116 |
| 6,651,433 B1 | * | 11/2003 | George, Jr. | 60/618 |
| 8,839,620 B2 | * | 9/2014 | Teng et al. | 60/618 |
| 2004/0050052 A1 | * | 3/2004 | Niikura et al. | 60/670 |
| 2005/0072155 A1 | * | 4/2005 | Tsutsui et al. | 60/670 |
| 2005/0072182 A1 | | 4/2005 | Taniguchi et al. | |

FOREIGN PATENT DOCUMENTS

| | | |
|---|---|---|
| DE | 28 18 003 | 3/1979 |
| DE | 10 2006 043 491 | 3/2008 |
| DE | 10 2009 056 822 | 12/2010 |
| EP | 1 930 603 | 6/2008 |

(Continued)

OTHER PUBLICATIONS

Translation of JP2008185001, Kobayashi et al, Aug. 14, 2008, Title: Waste Heat Recovering Device.*

*Primary Examiner* — Jesse Bogue
(74) *Attorney, Agent, or Firm* — Klaus J. Bach

(57) ABSTRACT

In a waste heat utilization arrangement for an internal combustion engine of a motor vehicle including a waste heat utilization circuit in which a working medium is circulated, a pumping device for pressurizing the working medium, an evaporator for vaporizing the working medium by waste heat of the internal combustion engine, an expansion machine for expanding the working medium while extracting mechanical energy therefrom and a condenser for condensing the working medium in a resting state, the waste heat utilization circuit is in communication with a pressure store capable of maintaining a pressure for setting and ensuring a predetermined adjustable minimum pressure of the working medium in the waste heat utilization circuit.

9 Claims, 2 Drawing Sheets

(56) References Cited

FOREIGN PATENT DOCUMENTS

| EP | 1930603 | A1 | 11/2008 |
| JP | 2008 185001 | | 8/2008 |
| WO | WO 2011/131482 | | 10/2011 |

* cited by examiner

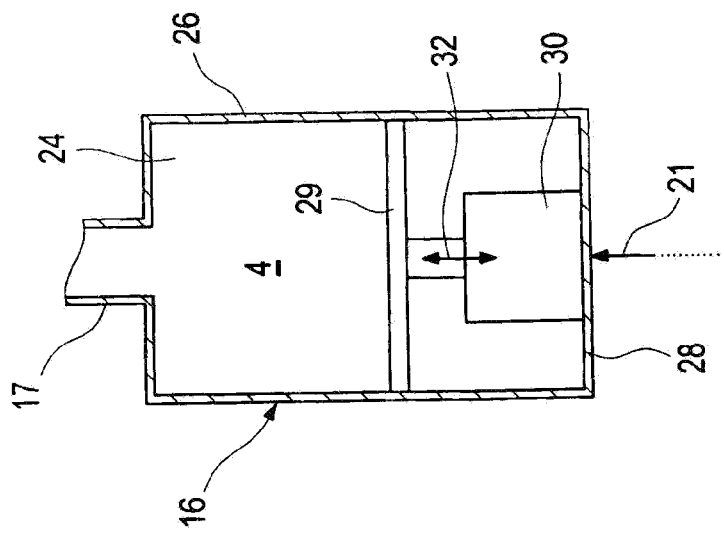
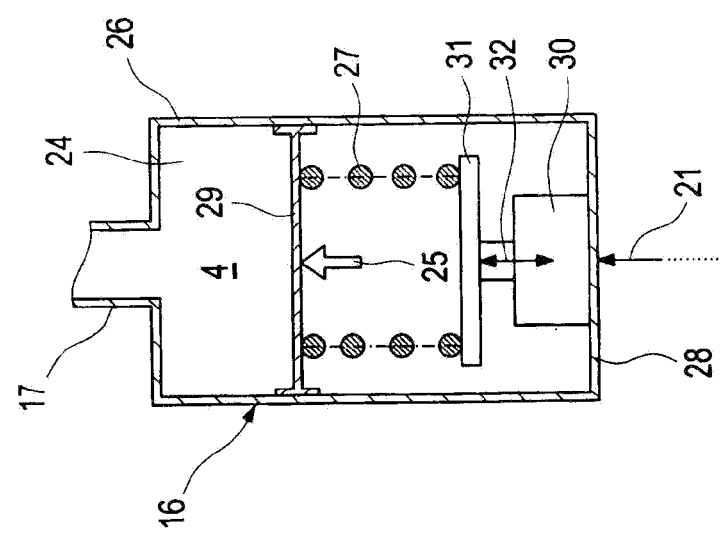
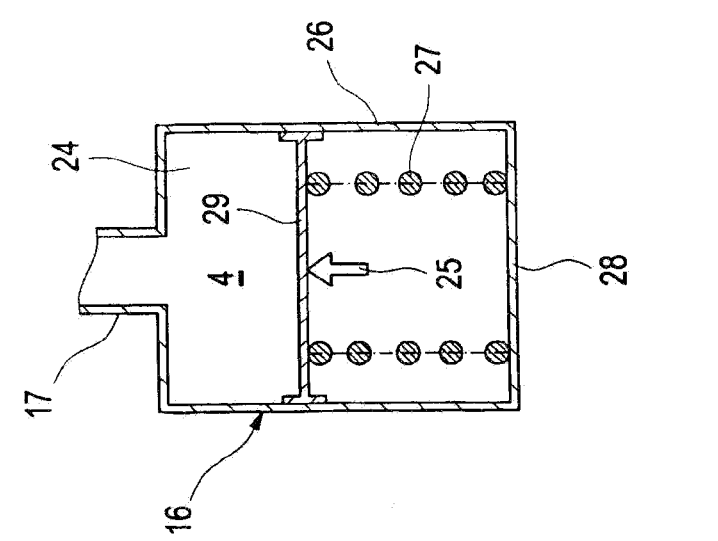

US 9,021,807 B2

WASTE HEAT UTILIZATION DEVICE AND OPERATING METHOD

This is a Continuation-In-Part application of pending international patent application PCT/EP2011/006039 filed Dec. 2, 2011 and claiming the priority of German patent application 10 2010 054 733.6 filed Dec. 16, 2010.

BACKGROUND OF THE INVENTION

The present invention relates to a waste heat utilization device for an internal combustion engine, in particular of a motor vehicle having a waste heat utilization circuit. The invention further relates to an associated operating method.

A waste heat utilization device is known from JP 2006-349211 A which operates according to the Rankine cyclic process or according to the Rankine Clausius process. This type of waste heat utilization device includes a waste heat utilization circuit in which a working medium circulates, a conveying device, situated in the waste heat utilization circuit for conveying the working medium against a high pressure, an evaporator situated in the waste heat utilization circuit downstream of the conveying device, for evaporating the working medium by utilizing waste heat from the internal combustion engine, expansion machine, situated in the waste heat utilization circuit downstream of the evaporator for expanding the working medium to a low pressure, and a condenser, situated in the waste heat utilization circuit downstream from the expansion machine, for condensing the working medium.

In the known waste heat utilization device, the evaporator is coupled by a heat-exchanger to a cooling circuit of the internal combustion engine in order to withdraw thermal energy from the internal combustion engine. In addition, in the known waste heat utilization device the condenser is coupled via a heat exchanger to a refrigeration circuit of an air conditioner in a vehicle equipped with the internal combustion engine in order to dissipate thermal energy from the waste heat utilization circuit. Furthermore, in the known waste heat utilization device a fluid coupling is provided between the refrigerating circuit of the air conditioner and the waste heat utilization circuit.

A heating or cooling device based on a Rankine cyclic process is known from DE 28 18 003 A1 having a main flow circuit for a fluid refrigerant, in which a heat exchanger, which cooperates with a heat source, as a compressor for the fluid refrigerant, a heat exchanger as a condenser for the fluid refrigerant, a pressure reducing valve, a heat exchanger, which preferably cooperates with an air stream to be cooled, as an evaporator, and a return pump for feeding the compressor with the fluid refrigerant, are situated one after the other in the flow direction, the compressor being formed from at least two heat exchangers for heat exchange between the fluid refrigerant and the heat source, and switchover devices are provided for feeding the condenser by the two heat exchangers in alternation, and at the same time the pump feeds the heat exchanger which at that time is not feeding the condenser, by means of a switchover sequence that is adapted to the alternating function of the heat exchangers. The return pump feeds the particular heat exchanger which is connected at that time, preferably with fluid refrigerant in the vaporous physical state. In the known heating or cooling device, the switchover devices are provided primarily to ensure that the heat source cooperates only with the heat exchanger(s) of the thermal compressor which is/are filled with fluid refrigerant at that time. To increase the uniformity of the function of the known heating or cooling device, a storage cylinder is provided directly downstream from the condenser, the storage cylinder continuing to, feed the main flow circuit, i.e., the pressure reducing valve and the evaporator connected downstream therefrom, even during time intervals of several seconds' duration in which the heat exchangers are temporarily switched off in the course of the switchover operation.

A waste heat utilization device which operates according to the Rankine cyclic process or according to the Rankine Clausius process is designed for operation at comparatively high temperatures in the working medium, for example at least 200° C. When the internal combustion engine is switched off, this results in cooling of the working medium, which is accompanied by a significant pressure drop. For example, in a rest state in which essentially an ambient temperature is present within the waste heat utilization device, a resting pressure in the working medium, which may be formed by a mixture of 70% $H_2O$ and 30% ethanol, for example, may be approximately 30 mbar (absolute). An enormous level of effort is necessary to be able to consistently seal off such low pressures. If this level of effort is avoided, a diffusion of ambient air into the waste heat utilization circuit results in the rest state. On the other hand, if an attempt is made to increase the quantity of the working medium in the waste heat utilization circuit, in hot operation this results in greatly increased pressures, which likewise are controllable only with a comparatively high level of effort.

It is therefore the object of the present invention to provide an improved design for a waste heat utilization device of the type mentioned at the outset, and for an associated operating method, the design being characterized in particular that the level of effort for sealing off for the rest state or the hot operating state is reduced.

SUMMARY OF THE INVENTION

In a waste heat utilization arrangement for an internal combustion engine of a motor vehicle including a waste heat utilization circuit in which a working medium is circulated, a pumping device for pressurizing the working medium, an evaporator for vaporizing the working medium by waste heat of the internal combustion engine, an expansion machine for expanding the working medium while extracting mechanical energy therefrom and a condenser for condensing the working medium in a resting state, the waste heat utilization circuit is in communication with a pressure store capable of maintaining a pressure for setting and ensuring a predetermined adjustable minimum pressure of the working medium in the waste heat utilization circuit.

The invention is based on the general concept of increasing in the resting state the mass or the volume of the working medium which may circulate in the preferably closed waste heat utilization circuit. As a result, the pressure in the working medium during cooling to ambient temperature is not able to drop as greatly as would be the case for a circuit with a constant volume or a constant mass of the working medium. Thus, due to the proposal according to the invention, when the waste heat utilization device is switched off, a minimum pressure may be set or ensured in the working medium which is above a resting pressure that would result if the circuit included only the working medium required in the waste heat utilization circuit during hot operation of the system.

By use of equipment, such a minimum pressure in the working medium may be set or ensured with the aid of a pressure store which is situated, in or coupled to, the waste heat utilization circuit.

The minimum pressure in the working medium that is to be set or ensured for the rest state or cold state of the waste heat utilization circuit may be fixedly predetermined or set, and selected in particular as a function of the ambient temperature in each case.

This type of pressure store may be situated, for example, between the condenser and the conveying device in the waste heat utilization circuit, i.e., in an area of the waste heat utilization circuit in which the working medium is usually liquid during normal operation. Thus, the pressure store may be designed as a liquid store, so that a comparatively large mass may be stored in a small volume.

The pressure store may be designed as a spring-loaded store in which a stored volume is pre-tensioned to the minimum pressure by means of an elastic force. The pressure store may thus be implemented particularly easily and inexpensively, preferably as a passive pressure store. In principle, for this type of spring-loaded pressure store it is possible to configure the elastic force so as to be adjustable in that the spring-loaded pressure store may also be implemented as an active spring-loaded pressure store. This is because the minimum pressure as well may be varied or set by means of the adjustable elastic force.

In general, it may be provided that the pressure store is designed as an active pressure store having an actuator for changing the minimum pressure. This type of active pressure store, in particular an active spring-loaded pressure store, allows the minimum pressure to be adapted depending on the situation. For example, the minimum pressure may be selected as a function of environmental parameters, for example the ambient temperature and/or ambient pressure.

In an active pressure store, the waste heat utilization device is advantageously equipped with a control device that is used for activating the actuator for setting the minimum pressure as a function of the instantaneous operating state of the waste heat utilization circuit and/or of the internal combustion engine. Thus, it is possible not only to consistently ensure the desired minimum pressure for cooling the waste heat utilization device, but also to adapt the minimum pressure or the system pressure during hot operation, for example to be able to compensate for mass displacements between the liquid phase and the gas phase which may occur during transient operating states, for example.

In one particularly advantageous embodiment, a minimum pressure of at least 500 mbar, preferably at least 600 mbar, is set or ensured in the working medium in a cold state of the waste heat utilization device which is cooled to ambient temperature. Such small negative pressures with respect to 1 bar ambient pressure may be controlled comparatively easily, which reduces the complexity of equipment for implementing the waste heat utilization device.

According to another advantageous embodiment, it may be provided that for transient operating states of the waste heat utilization device, the high pressure is regulated and/or controlled during hot operation of the waste heat utilization device with the aid of the active pressure store. Transient operating states of the waste heat utilization device may arise when the heat dissipation potential of the heat source that is used changes. The internal combustion engine generally constitutes the heat source. In particular, an exhaust system of the internal combustion engine is preferred as a heat source, since a comparatively large quantity of waste heat is available there for further utilization. If the operating state of the internal combustion engine changes with regard to load and/or speed, the temperature, pressure, and volumetric flow in the exhaust gas, i.e., the heat transported in the exhaust gas, also change in real time. If the heat that is transferable to the working medium in the evaporator changes, the evaporative capacity of the evaporator also changes, which results in mass displacement of the working medium between the liquid phase and the gas phase within the waste heat utilization circuit, and ultimately influences the high pressure in the waste heat utilization circuit. Since the waste heat utilization device is usually designed for optimal high pressures for a certain nominal operating state having a relatively narrow pressure range, a greatly varying high pressure which drops from the desired high pressure interval reduces the efficiency of the waste heat utilization device. By making use of the pressure store that is present in the waste heat utilization device according to the invention for controlling or regulating the high pressure, in such transient operating states it may be ensured comparatively easily that the high pressure of the waste heat utilization circuit remains within the predetermined high pressure interval, so that the waste heat utilization device operates within its optimized nominal operation, and thus at optimal efficiency.

According to another advantageous embodiment, the pressure store is activatable and deactivatable by means of a valve device, for example. In the activated state the pressure store is fluidly coupled to the waste heat utilization circuit, so that working medium may flow from the pressure store into the waste heat utilization circuit and back. In the deactivated state the pressure store is fluidly decoupled from the waste heat utilization circuit, so that no exchange of working medium is possible between the pressure store and the waste heat utilization circuit. Due to the possibility of activating and deactivating the pressure store, the waste heat utilization device, depending on its design, may be operated in an optimal manner in hot operation without having to take into account the additional working medium stored in the pressure store. This results in particularly simple handling and design.

The invention will become more readily apparent from the following description of exemplary embodiments thereof with reference to the accompanying the drawings, wherein identical, similar or functionally equivalent components are designated by the same reference numerals.

DESCRIPTION OF EXEMPLARY EMBODIMENTS

Figure 1:
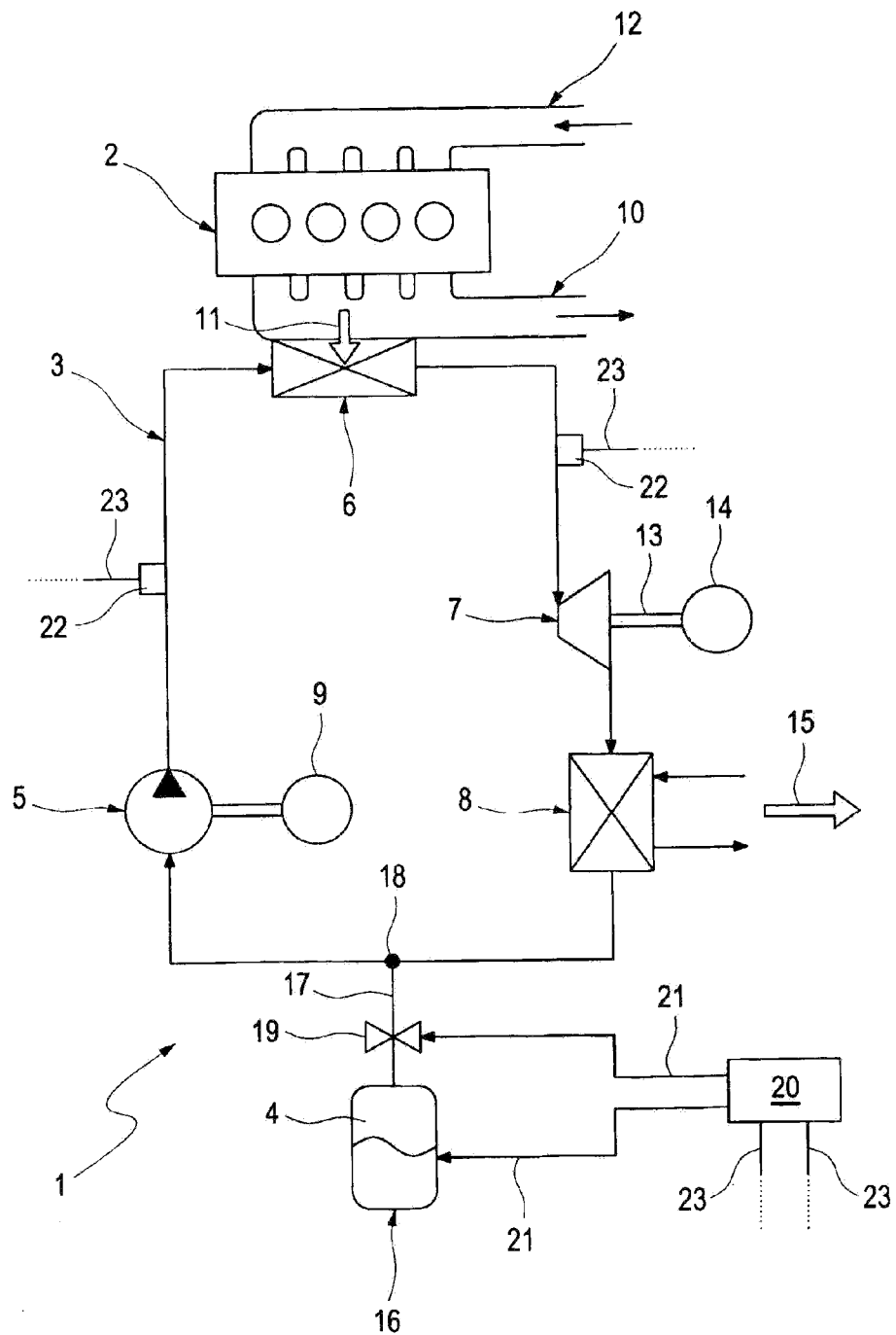
FIG. 1 shows a greatly simplified, circuit layout-like schematic diagram of a waste heat utilization device, and FIGS. 2 to 4 each show a greatly simplified, schematic sectional view of different embodiments of pressure store.

According to FIG. 1, a waste heat utilization device 1 which together with an internal combustion engine 2 may be situated in a motor vehicle includes a waste heat utilization circuit 3 in which a working medium 4 circulates. The waste heat utilization circuit 3 is preferably designed as a closed circuit. The waste heat utilization device 1 also includes a pumping device 5, an evaporator 6, an expansion machine 7, and a condenser 8.

The pumping device 5 is situated in the waste heat utilization circuit 3, and is used for pressurizing the working medium 4 to a high pressure. The pumping device 5 is advantageously designed as a volumetric pump, and for this purpose is drive-coupled to a drive motor 9. The evaporator 6 is situated in the waste heat utilization circuit 3, downstream from the conveying device 5, and is used for evaporating the pressurized working medium 4, for which purpose the evaporator 6 utilizes waste heat from the internal combustion engine 2. To this end, in the example the evaporator 6 is coupled in a heat-transferring manner to an exhaust system 10 of the internal combustion engine 2. A corresponding heat flow is indicated by an arrow 11. The internal combustion engine 2 also has a fresh air system 12.

The expansion machine 7, for example in the form of a turbine, is situated in the waste heat utilization circuit 3, downstream from the evaporator 6, and is used for expanding the working medium 4 to a low pressure. At the same time, with the aid of the expansion machine 7 energy may be withdrawn from the working medium, in particular in the form of mechanical work, for example for operating a shaft 13. The energy withdrawn from the working medium 4, or work for driving a generator 14 and/or any other given machine or component of the internal combustion engine 2 or of the vehicle equipped with same, may be used via the shaft 13. In addition, drive power may be transferred via the shaft 13 to a drive train, not shown, of the internal combustion engine 2 in order to add to the drive power of the internal combustion engine 2.

The condenser 8 is situated in the waste heat utilization circuit 3, downstream from the expansion machine 7, and is used for condensing the working medium 4. For this purpose, heat is withdrawn from the working medium 4 according to an arrow 15.

The waste heat utilization circuit 3 is thus designed as a Rankine cyclic process or a Rankine Clausius process.

The waste heat utilization device 1 according to the invention is also equipped with a pressure store 16, which for this purpose is situated in the waste heat utilization circuit 3, and by means of which a predetermined and/or an adjustable minimum pressure in the working medium 4 may be set and/or ensured. The pressure store 16 is advantageously situated between the condenser 8 and the conveying device 5 in the waste heat utilization circuit 3, or connected thereto. For this purpose, for example a connecting line 17 may be provided which fluidly couples the pressure store 16 to the waste heat utilization circuit 3. In the example, a connecting point 18 at which the connecting line 17 is connected to the waste heat utilization circuit 3 is located downstream from the condenser 8 and upstream of the conveying device 5.

A valve device 19 by means of which the connecting line 17 may be opened and closed may be situated in the connecting line 17. For this purpose, the valve device 19 may be activated with the aid of a control device 20 for opening and closing the connecting line 17. If the pressure store 16 is designed as an active pressure store 16 which allows a change in the minimum pressure in the working medium 4, the pressure store may likewise be activated by the control device 20. Appropriate activating lines or control lines for activating the valve device 19 or for activating the active pressure store 16 are denoted by reference numeral 21.

In the example, the waste heat utilization device 1 is also equipped with at least one pressure sensor 22, which is likewise coupled to the control device 20 via an appropriate signal line 23 in order to transmit to the control device 20 the particular measured pressure in the working medium 4. In the example, two such pressure sensors 22 are shown, or two possible installation sites for such a pressure sensor 22 are indicated. One pressure sensor 22 is located in the waste heat utilization circuit 3 between the conveying device 5 and the evaporator 6. The other pressure sensor 22 is located in the waste heat utilization circuit 3 between the evaporator 6 and the expansion machine 7. Thus, one pressure sensor 22 measures the high pressure in the liquid working medium, while the other pressure sensor 22 measures the high pressure in the vaporous working medium.

According to FIG. 2, the pressure store 16 may be designed as a spring-loaded store. In this type of spring-loaded pressure store 16, a stored volume 24 is pre-tensioned to the stated minimum pressure by means of an elastic force 25, indicated by an arrow. For generating the elastic force 25, at least one spring 27 is provided in a housing 26 of the pressure store 16, the spring being supported on the one hand on a base 28 of the housing 26 and on the other hand on a partition 29. The partition 29 delimits the stored volume 24. The partition 29 may be designed as a piston, as in the example shown. In addition, the partition 29 may be a displaceable diaphragm, so that the spring-loaded store 16 shown here then operates as a diaphragm spring-loaded store 16. This involves a passive pressure store 16 or a passive spring-loaded pressure store 16.

FIG. 3 shows another spring-loaded pressure store 16 in which, however, the elastic force 25 is adjustable, so that this involves an active spring-loaded pressure store 16. For example, this active spring-loaded pressure store 16 may have an actuator 30 by means of which an abutment 31 is displaceable, i.e., positionable relative to the housing base 28, corresponding to a double arrow 32. For this active spring-loaded store 16, the at least one spring 27 is supported on the abutment 31 on the housing side. The pre-tensioning 25 of the particular spring 27 may be changed by changing the position of the abutment 31 relative to the housing base 28. Since the pressure in the working medium 4, i.e., in the stored volume 24, is a function of the elastic force 25, the minimum pressure in the working medium 4 may be varied by activating the actuator 30.

FIG. 4 shows another active pressure store 16 which, however, is not designed as a spring-loaded store. In this embodiment, the pressure store 16 once again contains an actuator 30, which in this case, however, is used for displacing the partition 29 relative to the housing base 28. The pressure of the working medium 4 stored in the stored volume 24 may likewise be changed in this way.

The pressure store 16 is designed in such a way that it sets or ensures a minimum pressure in the working medium 4 when the waste heat utilization device 1 is switched off, the pressure being above a resting pressure. In the absence of a pressure store 16, or if the pressure store 16 were deactivated, this resting pressure would result during cooling of the active mass of the working medium 4 to ambient temperature. The active mass of the working medium 4 is the mass which circulates in the waste heat utilization circuit 3 during hot operation when the waste heat utilization device 1 is switched on. In a cold state cooled to ambient temperature or in the rest state of the waste heat utilization device 1, this minimum pressure may be, for example, 500 mbar, preferably at least 600 mbar.

If an active pressure store 16 is used, the control device 20 may control the particular pressure store 16 in such a way that a minimum pressure results in the working medium 4 which is a function of the instantaneous operating state of the waste heat utilization device 1 or of the internal combustion engine 2. For example, the control device 20 may, in a manner of speaking, proactively take into account changes in load and/or speed of the internal combustion engine 2 with regard to their effect on the pressure in the waste heat utilization circuit 3 in order to be able to intercept or limit a resulting change in the high pressure of the waste heat utilization circuit 3 by means of the accompanying change in the heat flow 11. In particular, for transient operating states of the waste heat utilization device 1 during hot operation of the waste heat utilization device 1, the high pressure may be regulated and/or controlled with the aid of the active pressure store 16, in particular to be able to compensate for variations in the heat input 11.

For these types of compensation processes, the pressure store 16 is activatable via a corresponding activation of the valve device 19. As soon as a steady-state operating state is once again present within the waste heat utilization device 1, the pressure store 16 may be deactivated by an appropriate activation of the valve device 19, for example to avoid interfering interactions between the working medium 4 circulating in the waste heat utilization circuit 3 and the working medium 4 stored in the pressure store 16.

What is claimed is:

1. A waste heat utilization arrangement for an internal combustion engine (2) of a motor vehicle, comprising:
  - a waste heat utilization circuit (3) in which a working medium (4) circulates,
  - a pumping device (5), arranged in the waste heat utilization circuit (3) for pressurizing the working, medium (4),
  - an evaporator (6) arranged in the waste heat utilization circuit (3) downstream from the pumping device (5) for vaporizing the working medium (4) by utilizing waste heat from the internal combustion engine (2),
  - an expansion machine (7) arranged in the waste heat utilization circuit (3) downstream from the evaporator (6) for expanding the working medium (4) to a low pressure while extracting mechanical energy therefrom,
  - a condenser (8) arranged in the waste heat utilization circuit (3) downstream from the expansion machine (7) for condensing the working medium (4), and
  - a pressure store (16) connected to the waste heat utilization circuit (3) downstream from the condenser (8) and upstream of the pumping device (5) in communication with the waste heat utilization circuit (3) and including an elastic force generating structure (27, 30) which is activatable for establishing a predetermined pressure in the working medium (4) such that a stored volume (24) is pre-tensioned to a minimum pressure by means of the elastic force generating structure (27, 30).

2. The waste heat utilization arrangement according to claim 1, wherein the pressure store (16) is includes a mechanical spring-loaded store.

3. The waste heat utilization arrangement according to claim 1, wherein
  - the pressure store (16) is an active pressure store and has an actuator (30) for changing the pressure provided by the elastic force, and
  - wherein a control device (20) is provided for activating the actuator (30) for adjusting the minimum pressure as a function of the instantaneous operating state of the waste heat utilization device (1) and the internal combustion engine (2).

4. A method for operating a waste heat utilization arrangement (1) for an internal combustion engine (2) of a motor vehicle, comprising:
  - a waste heat utilization circuit (3) in which a working medium (4) circulates,
  - a pumping device (5) arranged in the waste heat utilization circuit (3) for pressurizing the working medium (4),
  - an evaporator (6) arranged in the waste heat utilization circuit (3) downstream from the pumping device (5) for evaporating the working medium (4) by utilizing waste heat from the internal combustion engine (2),
  - an expansion machine (7) arranged in the waste heat utilization circuit (3) downstream from the evaporator (6) for expanding the working medium (4) to a low pressure while extracting mechanical energy therefrom, and
  - a condenser (8) arranged in the waste heat utilization circuit (3) downstream from the expansion machine (7) for condensing the working medium (4), and
  - a pressure store (16) connected to the waste heat utilization circuit (3) and including an elastic force generating structure (27, 30), the method comprising the step of:
  when the waste heat utilization arrangement (1) is switched off, actuating the elastic force generating structure (27, 30) for establishing in the waste heat utilization circuit (3) a minimum pressure which is above a resting state pressure that would result upon cooling of the working medium (4), which is contained in the utilization circuit (3) during hot operation, down to the ambient temperature of with the waste heat utilization arrangement (1).

5. The method according to claim 4, wherein a minimum pressure of at least 500 mbar of the working medium (9) is established in the waste heat utilization circuit (3) in a cold state of the waste heat utilization arrangement (1) upon its cooling to ambient temperature.

6. The method according to claim 5, wherein the minimum pressure is established by means of a pressure store (16) which is in communication in the waste heat utilization circuit (3) downstream from the condenser (8) and upstream of the conveying device (5) in the waste heat utilization circuit (3).

7. The method according to claim 6, wherein
  - the pressure store (16) is a spring-loaded store in which a stored volume (24) is pre-tensioned to the minimum pressure by means of an adjustable elastic force generator (27, 30),
  - the pressure store (16) is an active pressure store and has an actuator (30) for changing the minimum pressure, and
  - a control device (20) for activating the actuator (30) is provided for setting the minimum pressure as a function of the instantaneous operating state of the waste heat utilization device (1) and the internal combustion engine (2).

8. The method according to claim 7, wherein for transient operating states of the waste heat utilization arrangement (1) during hot operation of the waste heat utilization device (1), a high pressure is controlled with the aid of the active pressure store (16).

9. The method according to claim 6, wherein the pressure store (16) is activatable, i.e., fluidly coupleable, to the waste heat utilization circuit (3), and deactivatable, i.e., fluidly decoupleabie from the waste heat utilization circuit (3) by means of a valve device (19) arranged in a communication line between the waste heat utilization circuit and the waste heat utilization circuit (3).

* * * * *